United States Patent
Yang et al.

(10) Patent No.: US 11,509,213 B2
(45) Date of Patent: Nov. 22, 2022

(54) LLC RESONANT CONVERTER, CONTROL UNIT, AND METHOD OF CONTROLLING THE SAME

(71) Applicant: DELTA ELECTRONICS, INC., Taoyuan (TW)

(72) Inventors: Shang-Kay Yang, Taoyuan (TW); Hsien-Kai Wang, Taoyuan (TW); Yen-Wei Lin, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 0 days.

(21) Appl. No.: 17/370,645

(22) Filed: Jul. 8, 2021

(65) Prior Publication Data
US 2022/0103082 A1    Mar. 31, 2022

(30) Foreign Application Priority Data

Sep. 30, 2020    (CN) .......................... 202011067670.7

(51) Int. Cl.
*H02M 3/335*    (2006.01)
*H02M 3/00*    (2006.01)
*H02M 1/00*    (2006.01)

(52) U.S. Cl.
CPC ........... *H02M 3/01* (2021.05); *H02M 1/0096* (2021.05); *H02M 3/33571* (2021.05); *H02M 3/33573* (2021.05); *H02M 3/33592* (2013.01)

(58) Field of Classification Search
CPC .... H02M 3/01; H02M 3/335; H02M 3/33569; H02M 3/33571; H02M 3/33573; H02M 3/33576; H02M 3/33592; H02M 1/0096
See application file for complete search history.

(56) References Cited

U.S. PATENT DOCUMENTS

| 10,903,748 | B2* | 1/2021 | Escudero Rodriguez ................... H02M 7/04 |
| 2015/0229225 | A1* | 8/2015 | Jang .................. H02M 3/33592 363/17 |
| 2016/0105120 | A1* | 4/2016 | Hirano .............. H02M 3/33584 363/17 |

(Continued)

FOREIGN PATENT DOCUMENTS

| CN | 107346940 A | 11/2017 |
| CN | 207251477 U | 4/2018 |
| CN | 109756142 A | 5/2019 |

OTHER PUBLICATIONS

Office Action issued in corresponding Taiwan patent application No. 109134043 dated Jun. 15, 2021 (9 pages).

*Primary Examiner* — Gary L Laxton
(74) *Attorney, Agent, or Firm* — Muncy, Geissler, Olds & Lowe, P.C.

(57) ABSTRACT

An LLC resonant converter includes a square wave generator having a first switch and a second switch, a resonant tank, a transformer, a synchronous rectifying (SR) unit having a first SR switch and a second SR switch, and a control unit. The control unit provides a first control signal controls the first switch, a second control signal controls the second switch, a first rectifying control signal controls the first SR switch, a second rectifying control signal controls the second SR switch. When a frequency control command is lower than a phase-shift frequency, the first control signal and the first rectifying control signal are frequency-variable and phase-shifted, and the second control signal and the second rectifying control signal are frequency-variable and phase-shifted.

17 Claims, 10 Drawing Sheets

(56) References Cited

U.S. PATENT DOCUMENTS

| | | | |
|---|---|---|---|
| 2017/0353111 A1* | 12/2017 | Elasser | H02M 3/33507 |
| 2021/0359613 A1* | 11/2021 | Leirens | H02M 1/0058 |
| 2022/0052611 A1* | 2/2022 | Ngoua Teu Magambo | H02M 3/33584 |
| 2022/0103080 A1* | 3/2022 | Yang | H02M 1/15 |

* cited by examiner

LLC RESONANT CONVERTER, CONTROL UNIT, AND METHOD OF CONTROLLING THE SAME

BACKGROUND

Technical Field

The present disclosure relates to an LLC resonant converter, a control unit, and a method of controlling the same, and more particularly to an LLC resonant converter with extended hold-up time, a control unit, and a method of controlling the same.

Description of Related Art

The statements in this section merely provide background information related to the present disclosure and do not necessarily constitute prior art.

LLC resonant converter is a DC-to-DC power converter, which has more advantages compared with other DC power converters. Since its design and control manners are more complicated, however, it has received less attention and research in the past. Due to the advancement of circuit design and control technology in recent years, many control technologies related to LLC resonant converters have been developed, which makes the design of LLC resonant converters easier and makes this technology get more attention. The LLC resonant converter has the advantages of turning on switches at the primary side under zero voltage transition (ZVS turned-on), turning off switches at the secondary side under zero current transition (ZCS turned-off), and high efficiency.

Figure 1:
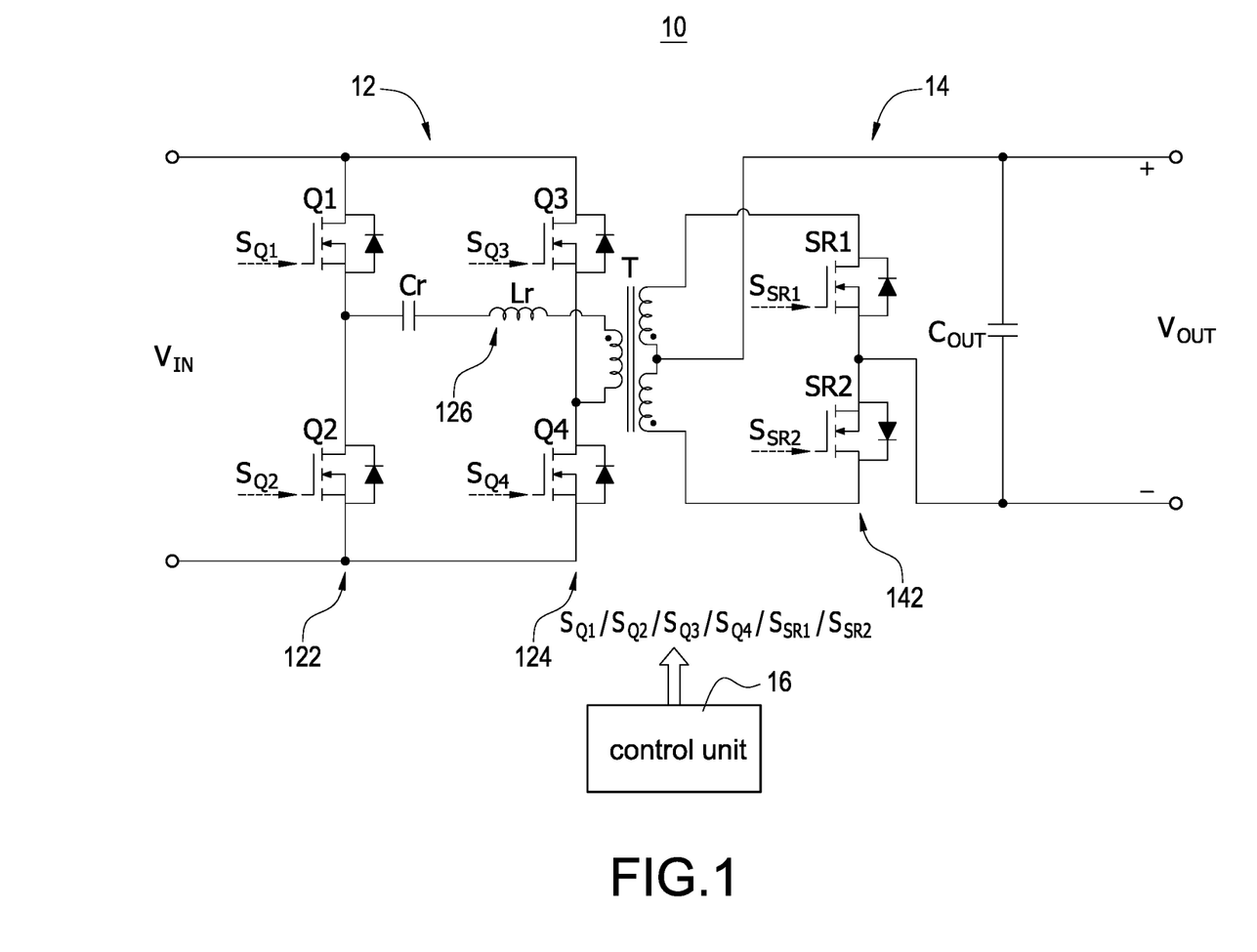
FIG. 1 is a circuit diagram of an LLC resonant converter according to a first embodiment of the present disclosure.

Take a full-bridge LLC resonant converter as an example (as shown in FIG. 1), its primary side has a first bridge arm and a second bridge arm connected to the first bridge arm in parallel. The first bridge arm is composed of a first switch Q1 and a second switch Q2, and the second bridge arm is composed of a third switch Q3 and a fourth switch Q4. Its secondary side has a synchronous rectifying switch bridge arm composed of a first synchronous rectifying switch SR1 and a second synchronous rectifying switch SR2. The existing control manner provides PWM signals with the same phase to control the first switch Q1, the fourth switch Q4, and the first synchronous rectifying switch SR1, and provides PWM signals with the same phase to control the second switch Q2, the third switch Q3, and the second synchronous rectifying switch SR2. However, this control manner has the following disadvantages when the input voltage is insufficient:

1. High efficiency application. In order to achieve higher efficiency, the voltage gain is generally designed to be lower, but it may cause insufficient voltage gain to make the hold-up time lower.

2. High hold-up time application. In order to achieve higher hold-up time, the voltage gain is generally designed to be higher, but it may cause the efficiency to become lower.

In the prior art, in order to improve the above-mentioned problems, the secondary-side synchronous rectification is used as a phase shift operation to acquire higher voltage gain to extend the hold-up time. The first switch Q1, the second switch Q2, the third switch Q3, the fourth switch Q4, the first synchronous rectifying switch SR1, and the second synchronous rectifying switch SR2 operate at a required minimum fixed frequency, and the first synchronous rectifying switch SR1 and the second synchronous rectifying switch SR2 perform the phase shift operation so as to increase the voltage gain to extend the hold-up time when the input voltage is insufficient. However, the disadvantage of this technology is that when operating at a lower switching frequency, the first synchronous rectifying switch SR1 and the second synchronous rectifying switch SR2 start to phase shift, and the instantaneous change of the voltage gain is significant, which will be difficult to control the output voltage.

SUMMARY

An object of the present disclosure is to provide an LLC resonant converter to solve the existing problems of the related art.

In order to achieve the above-mentioned object, the LLC resonant converter includes a square wave generator, a resonant tank, a transformer, a synchronous rectifying unit, and a control unit. The square wave generator has a first switch and a second switch connected to the first switch in series. The resonant tank is coupled to the square wave generator. The transformer has a primary side and a secondary side, and the primary side is coupled to the resonant tank. The synchronous rectifying unit is coupled to the secondary side, and has a first synchronous rectifying switch and a second synchronous rectifying switch. The control unit receives an output voltage of the resonant converter, acquires a frequency control command according to the output voltage, and provides a first control signal to control the first switch, a second control signal to control the second switch, a first rectifying control signal to control the first synchronous rectifying switch, and a second rectifying control signal to control the second synchronous rectifying switch. When the frequency control command is higher than a phase-shift frequency, the first control signal and the first rectifying control signal are frequency-variable and phase-fixed, and the second control signal and the second rectifying control signal are frequency-variable and phase-fixed. When the frequency control command is lower than the phase-shift frequency, the first control signal and the first rectifying control signal are frequency-variable and phase-shifted, and the second control signal and the second rectifying control signal are frequency-variable and phase-shifted.

Therefore, the LLC resonant converter is provided to both increase a high voltage gain and extend a hold-up time.

Another object of the present disclosure is to provide a control unit of an LLC resonant converter to solve the existing problems of the related art.

In order to achieve the above-mentioned object, the control unit of the LLC resonant converter provides a control signal to control a square wave generator at a primary side of the resonant converter and provides a rectifying control signal to control a synchronous rectifying unit at a secondary side, and the control unit acquires a frequency control command according to an output voltage of the resonant converter. When the frequency control command is higher than a phase-shift frequency, the control signal and the rectifying control signal are frequency-variable and phase-fixed. When the frequency control command is lower than the phase-shift frequency, the control signal and the rectifying control signal are frequency-variable and phase-shifted.

Therefore, the control unit of the LLC resonant converter is provided to both increase a high voltage gain and extend a hold-up time.

Further another object of the present disclosure is to provide a method of controlling an LLC resonant converter to solve the existing problems of the related art.

In order to achieve the above-mentioned object, the resonant converter includes a switch bridge arm at a primary side of a transformer and a synchronous rectifying unit at a secondary side of the transformer. The switch bridge arm is composed of a first switch controlled by a first control signal and a second switch controlled by a second control signal, and the synchronous rectifying unit is composed of a first synchronous rectifying switch controlled by a first rectifying control signal and a second synchronous rectifying switch controlled by a second rectifying control signal. The method includes steps of: acquiring an operation frequency according to an output voltage feedback value, determining whether the operation frequency is higher than a phase-shift frequency, controlling the first control signal and the first rectifying control signal to be frequency-variable and phase-fixed and controlling the second control signal and the second rectifying control signal to be frequency-variable and phase-fixed when the operation frequency is higher than the phase-shift frequency, and controlling the first control signal and the first rectifying control signal to be frequency-variable and phase-shifted and controlling the second control signal and the second rectifying control signal to be frequency-variable and phase-shifted when the operation frequency is lower than the phase-shift frequency.

Therefore, the method of controlling the LLC resonant converter is provided to both increase a high voltage gain and extend a hold-up time.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawings as follows.

DETAILED DESCRIPTION

Reference will now be made to the drawing figures to describe the present disclosure in detail. It will be understood that the drawing figures and exemplified embodiments of present disclosure are not limited to the details thereof.

The LLC resonant converter of the present disclosure includes a square wave generator, a resonant tank, a transformer, a synchronous rectifying unit, and a control unit. The LLC resonant converter is a converter having a function of extended hold-up time. The square wave generator is coupled to the resonant tank and a primary side of the transformer, and has a first switch and a second switch connected to the first switch in series. The synchronous rectifying unit is coupled to a secondary side of the transformer, and has a first synchronous rectifying switch and a second synchronous rectifying switch.

The control unit receives an output voltage signal outputted from the LLC resonant converter, and the output voltage signal can provide information about the output voltage of the LLC resonant converter. The control unit acquires a frequency control command according to the output voltage signal to provide a first control signal to control the first switch, provide a second control signal to control the second switch, provide a first rectifying control signal to control the first synchronous rectifying switch, and provide a second rectifying control signal to control the second synchronous rectifying switch. In particular, the frequency control command is related to an operation frequency of the first control signal, the second control signal, the first rectifying control signal, and the second rectifying control signal.

Figure 2:
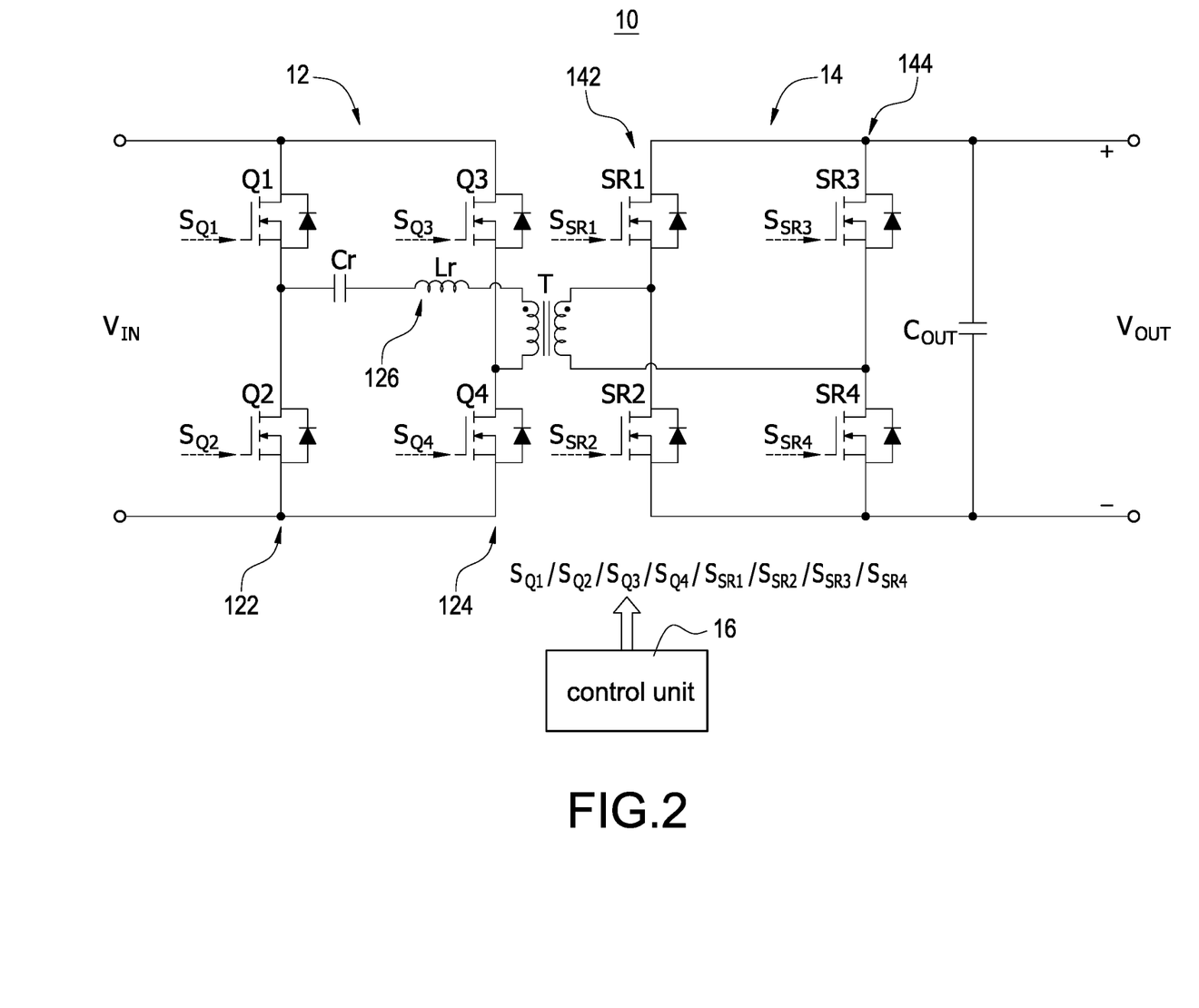
FIG. 2 is a circuit diagram of the LLC resonant converter according to a second embodiment of the present disclosure.

In the following, the differences between different circuit topologies will be explained. Please refer to FIG. 1 to FIG. 4, which show circuit diagrams of the LLC resonant converter according to a first embodiment, a second embodiment, a third embodiment, and a fourth embodiment of the present disclosure, respectively. The LLC resonant converter 10 includes a transformer T, a primary-side circuit 12, a secondary-side circuit 14, and a control unit 16. The primary-side circuit 12 shown in FIG. 1 and FIG. 2 is a full-bridge circuit structure.

The primary-side circuit 12 includes a first switch bridge arm 122, a second switch bridge arm 124, and a resonant tank 126. In particular, a square wave generator is composed of the first switch bridge arm 122 and the second switch bridge arm 124.

Figure 7A:
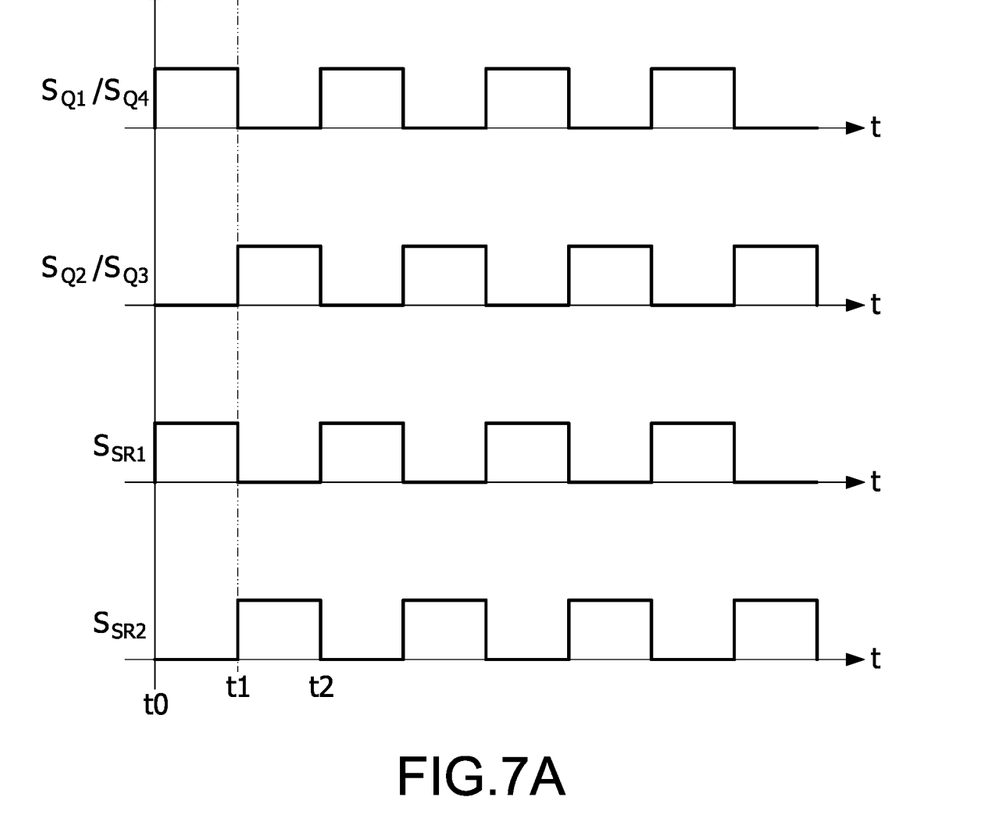
FIG. 7A-FIG. 7C are schematic diagrams of control signals under different operation modes of the LLC resonant converter according to the present disclosure.

The first switch bridge arm 122 is coupled to a primary side of the transformer T, and has a first switch Q1 and a second switch Q2 connected to the first switch Q1 in series. The control unit 16 provides a first control signal $S_{Q1}$ to control the first switch Q1 and provides a second control signal $S_{Q2}$ to control the second switch Q2. The second switch bridge arm 124 is connected to the first switch bridge arm 122 in parallel, and has a third switch Q3 and a fourth switch Q4 connected to the third switch Q3 in series. The control unit 16 provides a third control signal $S_{Q3}$ to control the third switch Q3 and provides a fourth control signal $S_{Q4}$ to control the fourth switch Q4. In particular, the first control signal $S_{Q1}$ and the fourth control signal $S_{Q4}$ are the same control signal, and the second control signal $S_{Q2}$ and the third control signal $S_{Q3}$ are the same control signal (as shown in FIG. 7A). Also, the first control signal $S_{Q1}$ and the second control signal $S_{Q2}$ are complementary.

The resonant tank 126 is coupled between the first switch bridge arm 122 and the second switch bridge arm 124, and is composed of a resonant inductance Lr, a magnetizing inductance (not shown) of the transformer T, and a resonant capacitance Cr to form an LLC resonant tank.

Figure 3:
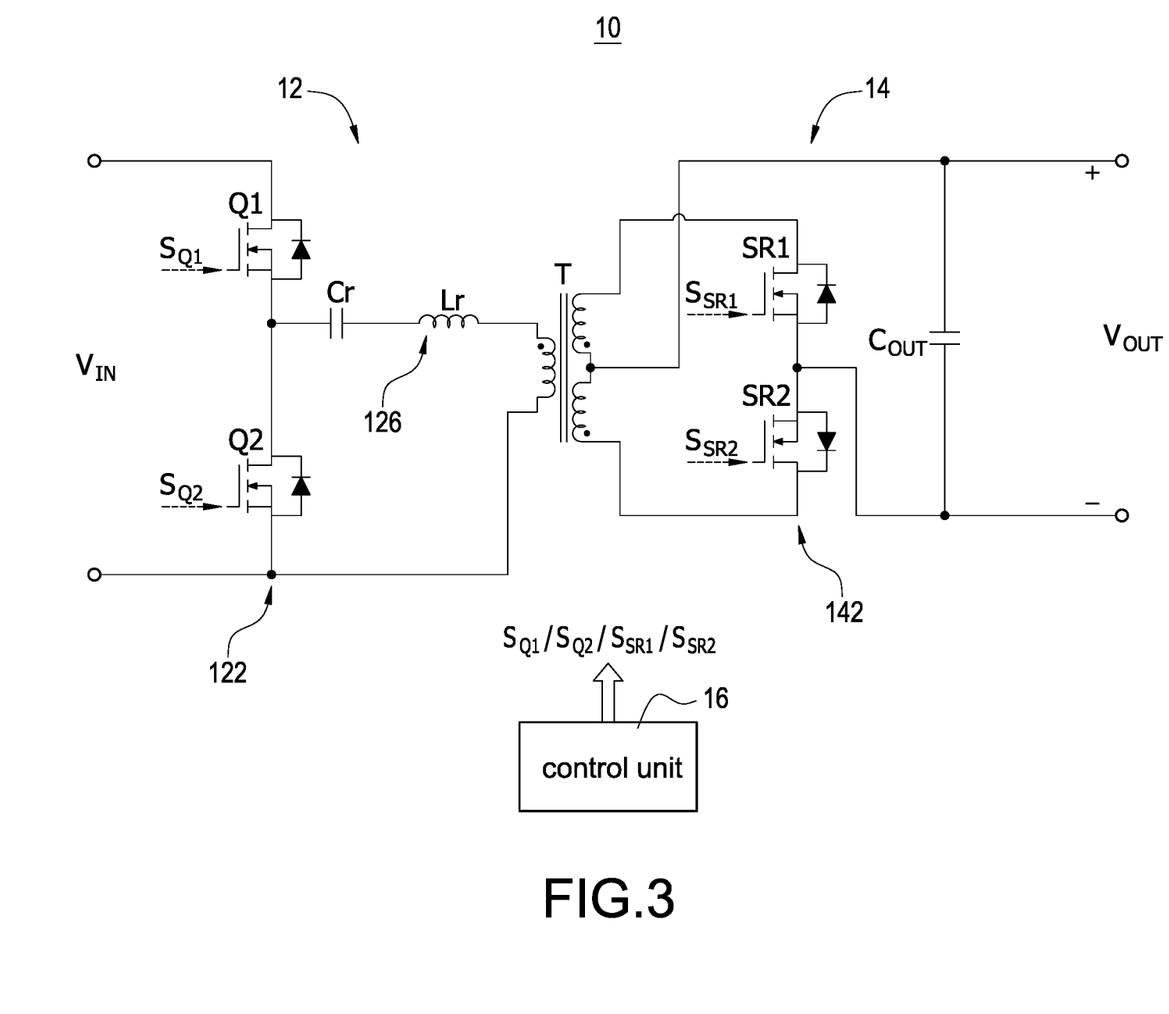
FIG. 3 is a circuit diagram of the LLC resonant converter according to a third embodiment of the present disclosure.
Figure 4:
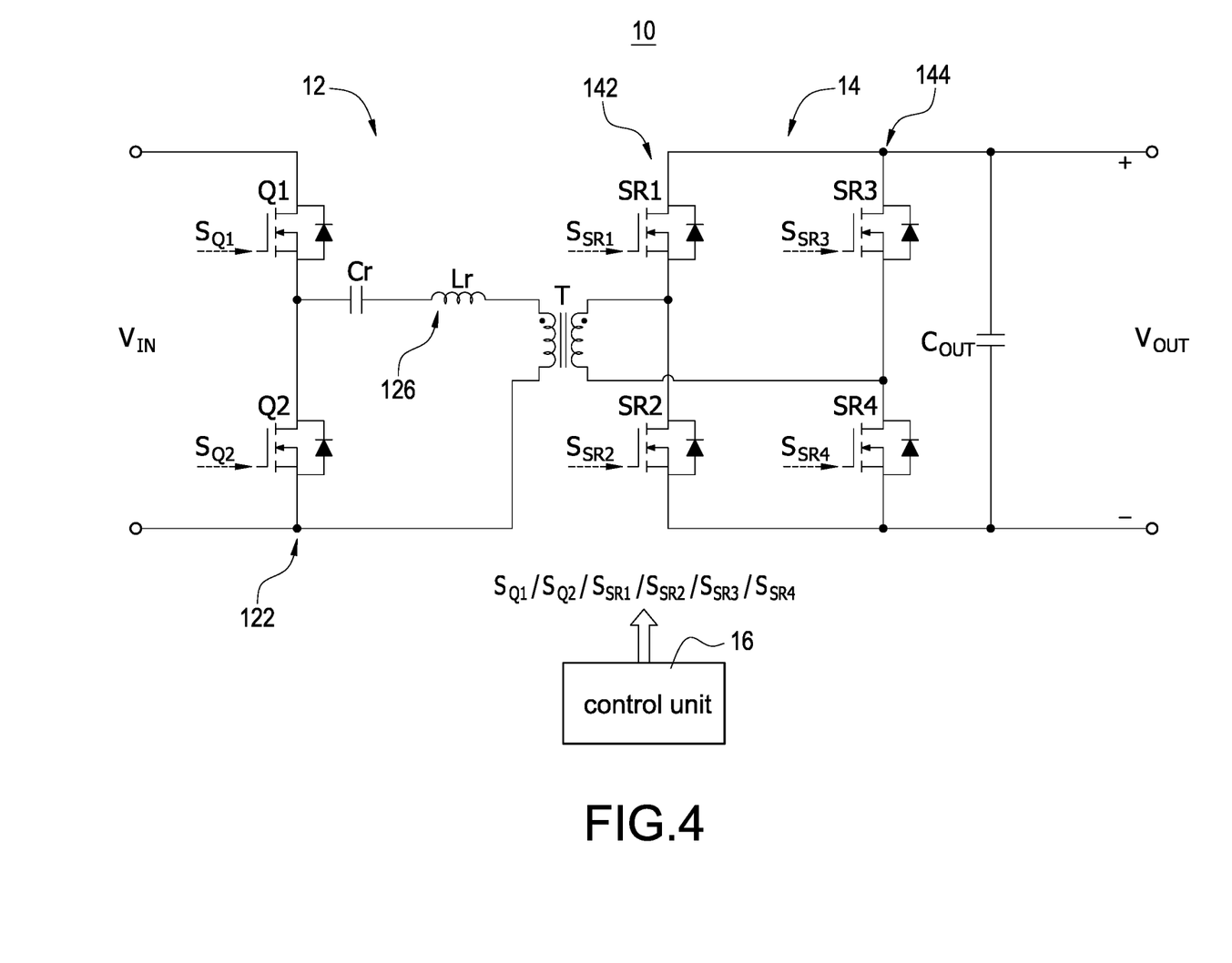
FIG. 4 is a circuit diagram of the LLC resonant converter according to a fourth embodiment of the present disclosure.

The primary-side circuit 12 shown in FIG. 3 and FIG. 4 is a half-bridge circuit structure. The primary-side circuit 12 includes a first switch bridge arm 122 and a resonant tank 126. The first switch bridge arm 122 is coupled to a primary side of the transformer T, and has a first switch Q1 and a second switch Q2 connected to the first switch Q1 in series. The control unit 16 provides a first control signal $S_{Q1}$ to control the first switch Q1 and provides a second control signal $S_{Q2}$ to control the second switch Q2. In particular, the first control signal $S_{Q1}$ and the second control signal $S_{Q2}$ are complementary.

The resonant tank 126 is coupled between the first switch Q1 and the second switch Q2 of the first switch bridge arm 122, and is composed of a resonant inductance Lr, a magnetizing inductance (not shown) of the transformer T, and a resonant capacitance Cr to form an LLC resonant tank. The resonant tank in the present disclosure is not limited to the connection structure shown in the figure, and the structure that can use inductance (L) and capacitance (C) to generate two resonant frequencies should be embraced within the scope of the present disclosure.

The secondary-side circuit 14 shown in FIG. 1 and FIG. 3 is a center-tapped circuit structure. The secondary-side circuit 14 includes a first synchronous rectifying bridge arm 142. The first synchronous rectifying bridge arm 142 is coupled to the secondary side of the transformer T, and has a first synchronous rectifying switch SR1 and a second synchronous rectifying switch SR2 connected to the first synchronous rectifying switch SR1 in series. The output port of the LLC resonant converter 10 is formed by the center tap of the transformer T and a common-connected point of the first synchronous rectifying switch SR1 and the second synchronous rectifying switch SR2. The control unit 16 provides a first rectifying control signal $S_{SR1}$ to control the first synchronous rectifying switch SR1 and provides a second rectifying control signal $S_{SR2}$ to control the second synchronous rectifying switch SR2. In particular, the first rectifying control signal $S_{SR1}$ and the second rectifying control signal $S_{SR2}$ are complementary (as shown in FIG. 7A).

The secondary-side circuit 14 shown in FIG. 2 and FIG. 4 is a full-bridge circuit structure. The secondary-side circuit 14 includes a first synchronous rectifying bridge arm 142 and a second synchronous rectifying bridge arm 144. The first synchronous rectifying bridge arm 142 is coupled to the secondary side of the transformer T, and has a first synchronous rectifying switch SR1 and a second synchronous rectifying switch SR2 connected to the first synchronous rectifying switch SR1 in series. The second synchronous rectifying bridge arm 144 is connected to the first synchronous rectifying bridge arm 142 in parallel, and has a third synchronous rectifying switch SR3 and a fourth synchronous rectifying switch SR4 connected to the third synchronous rectifying switch SR3 in series. The control unit 16 provides a first rectifying control signal $S_{SR1}$ to control the first synchronous rectifying switch SR1, provides a second rectifying control signal $S_{SR2}$ to control the second synchronous rectifying switch SR2, provides a third rectifying control signal $S_{SR3}$ to control the third synchronous rectifying switch SR3, and provides a fourth rectifying control signal $S_{SR4}$ to control the fourth synchronous rectifying switch SR4. In particular, the first rectifying control signal $S_{SR1}$ and the fourth rectifying control signal $S_{SR4}$ are the same control signal, and the second rectifying control signal $S_{SR2}$ and the third rectifying control signal $S_{SR3}$ are the same control signal. Also, the first rectifying control signal $S_{SR1}$ and the second rectifying control signal $S_{SR2}$ are complementary.

In order to facilitate the description of the operation and control principle of the LLC resonant converter, the circuit topology shown in FIG. 1 is taken as an example for description. Please refer to FIG. 5 and FIG. 6, which show a schematic block diagram of a control circuit and a schematic diagram of frequency and phase under different operation modes of the LLC resonant converter according to the present disclosure, respectively.

Figure 5:
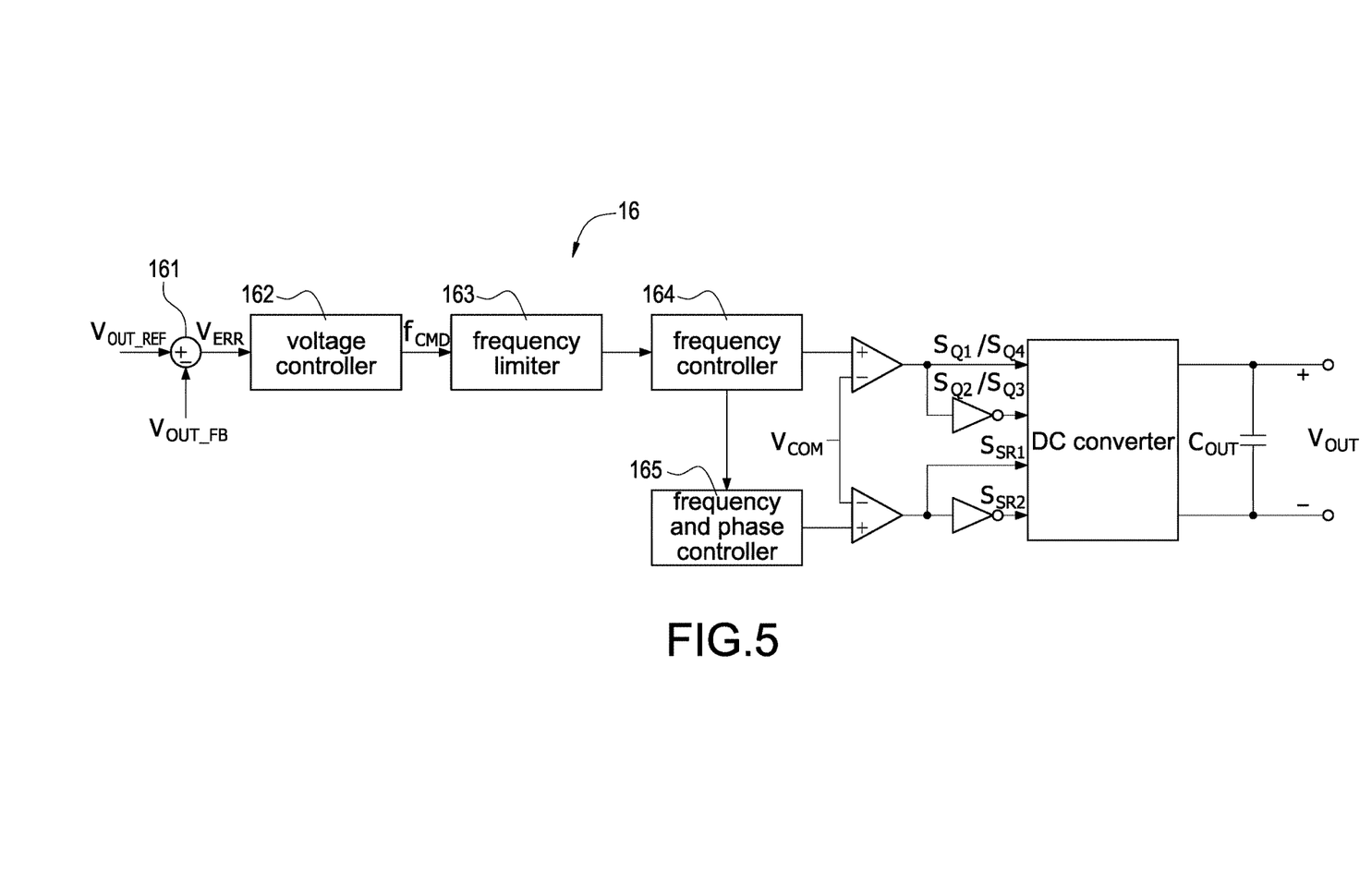
FIG. 5 is a schematic block diagram of a control circuit according to the present disclosure.

The control unit 16 receives an output voltage signal outputted from the LLC resonant converter 10, and acquires a frequency control command $f_{CMD}$ according to the output voltage signal. Specifically, the control unit 16 receives an output voltage feedback value $V_{OUT\_FB}$ and an output voltage reference value $V_{OUT\_REF}$ through a comparison unit 161 of the control unit 16. The comparison unit 16 compares the output voltage feedback value $V_{OUT\_FB}$ with the output voltage reference value $V_{OUT\_REF}$ by a subtraction operation to acquire a voltage error value $V_{ERR}$.

A voltage controller 162 of the control unit 16 receives the voltage error value $V_{ERR}$, and calculates the voltage error value $V_{ERR}$ to acquire the frequency control command $f_{CMD}$. Take a proportional-integral (PI) controller to be the voltage controller 162 as an example, but the present disclosure is not limited. The voltage controller 162 performs proportional and integral linear combination operations on the voltage error value $V_{ERR}$ to acquire a control variable, i.e., the frequency control command $f_{CMD}$. Furthermore, in order to ensure that the frequency control command $f_{CMD}$ is not higher than the maximum frequency value $f_{MAX}$ or lower than the minimum frequency value $f_{MIN}$, a frequency limiter 163 is used to limit the upper limitation value and the lower limitation value of the frequency control command $f_{CMD}$.

Figure 6:
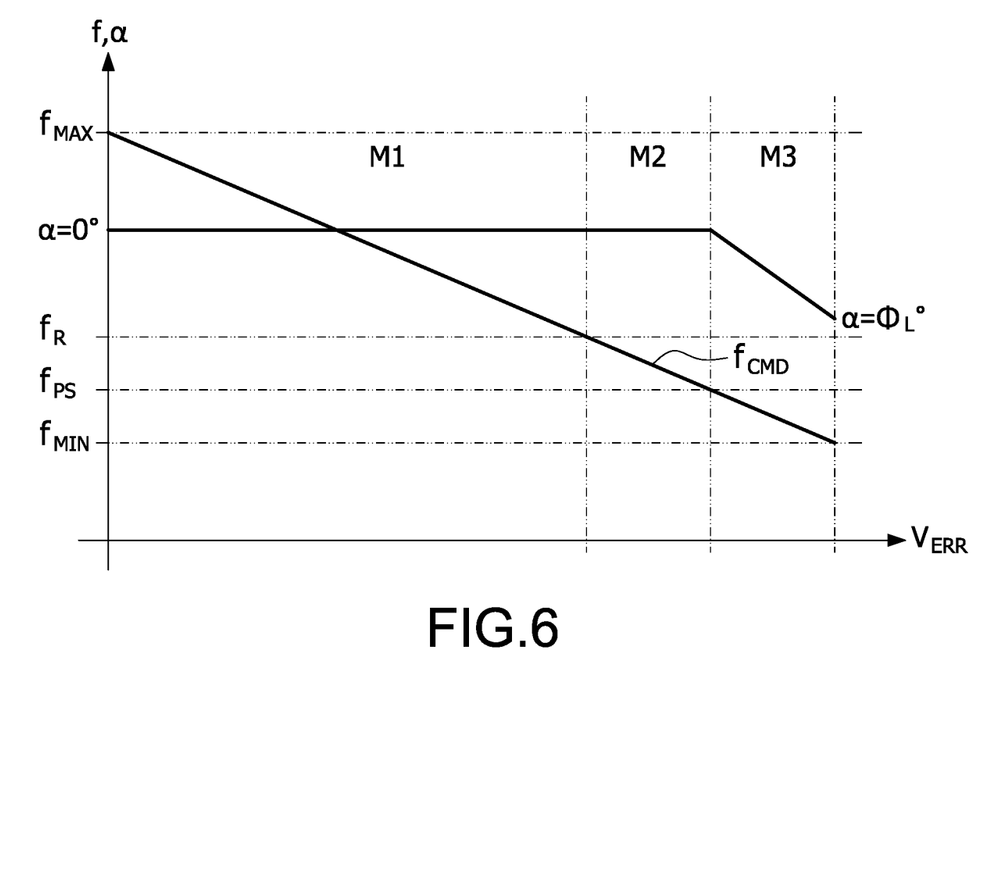
FIG. 6 is a schematic diagram of frequency and phase under different operation modes of the LLC resonant converter according to the present disclosure.
Figure 7B:
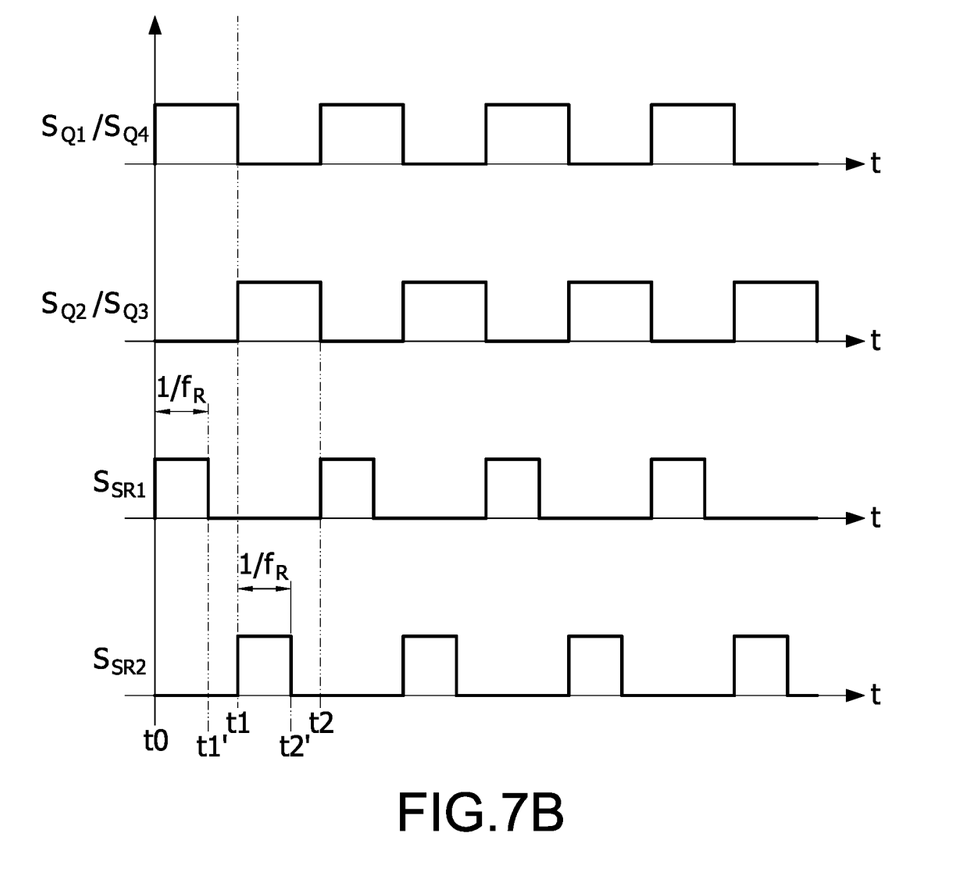
Figure 7C:
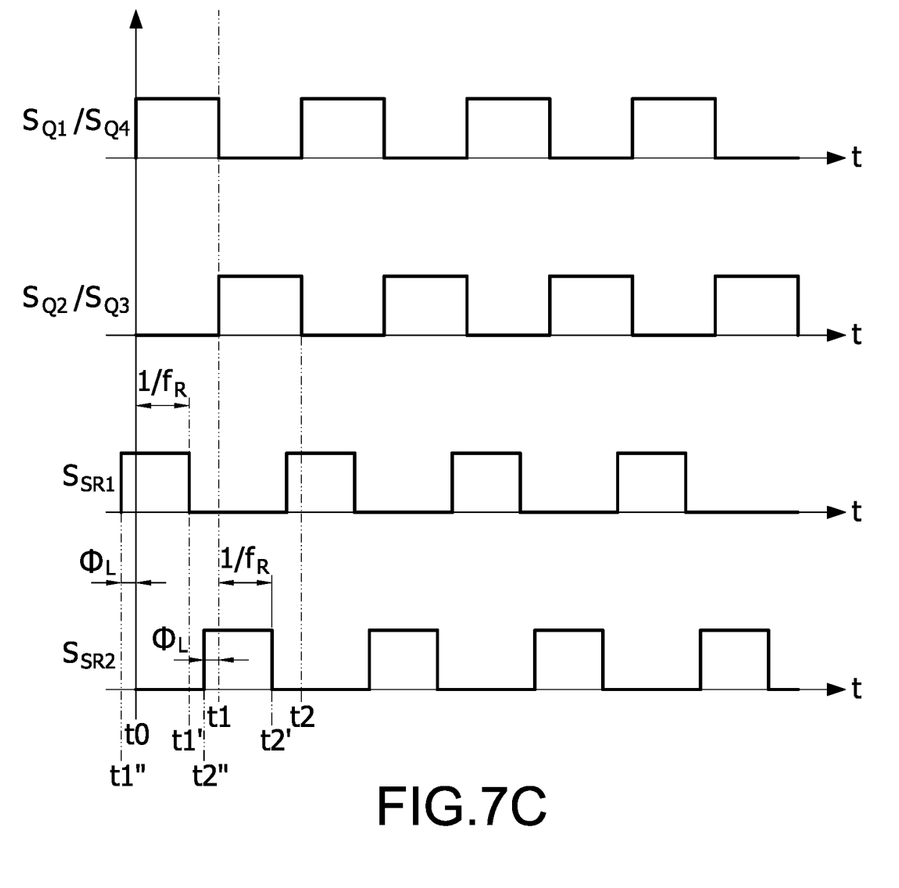

Please refer to FIG. 7A to FIG. 7C, which show schematic diagrams of control signals under different operation modes of the LLC resonant converter according to the present disclosure, and also refer to FIG. 6. When the frequency control command $f_{CMD}$ is higher than a phase-shift frequency $f_{PS}$ set by the control unit 16 and is higher than a resonance frequency $f_R$ of the LLC resonant converter 10, the LLC resonant converter 10 operates in a first operation mode M1 (also see FIG. 7A). In this operation mode, the first control signal $S_{Q1}$ (the same signal as the fourth control signal $S_{Q4}$) and the first rectifying control signal $S_{SR1}$ are frequency-variable and phase-fixed, and the second control signal $S_{Q2}$ (the same signal as the third control signal $S_{Q3}$) and the second rectifying control signal $S_{SR2}$ are frequency-variable and phase-fixed. Therefore, a rising edge phase difference a between the first control signal $S_{Q1}$ and the first rectifying control signal $S_{SR1}$ is zero degree, and a rising edge phase difference a between the second control signal $S_{Q2}$ and the second rectifying control signal $S_{SR2}$ is also zero degree. In this operation mode, the first switch Q1, the second switch Q2, the third switch Q3, the fourth switch Q4 at the primary side, the first synchronous rectifying switch SR1, and the second synchronous rectifying switch SR2 at the secondary side operate in a variable frequency mode. The variable frequency control in the variable frequency mode is implemented by a frequency controller 164 shown in FIG. 5.

When the frequency control command $f_{CMD}$ is higher than the phase-shift frequency $f_{PS}$ set by the control unit 16 but is lower than the resonance frequency $f_R$ of the LLC resonant converter 10, the LLC resonant converter 10 operates in a second operation mode M2 (also see FIG. 7B). In this operation mode, the first control signal $S_{Q1}$ (the same signal as the fourth control signal $S_{Q4}$) and the first rectifying control signal $S_{SR1}$ are frequency-variable and phase-fixed, and the second control signal $S_{Q2}$ (the same signal as the third control signal $S_{Q3}$) and the second rectifying control signal $S_{SR2}$ are frequency-variable and phase-fixed. Therefore, a rising edge phase difference a between the first control signal $S_{Q1}$ and the first rectifying control signal $S_{SR1}$ is zero degree, and a rising edge phase difference a between the second control signal $S_{Q2}$ and the second rectifying control signal $S_{SR2}$ is also zero degree. In this operation mode, duty cycles of the first rectifying control signal $S_{SR1}$ and the second rectifying control signal $S_{SR2}$ are equal to a resonance period. The resonance period is the reciprocal of the resonance frequency $f_R$, i.e., $1/f_R$. In this operation mode, the first switch Q1, the second switch Q2, the third switch Q3, the fourth switch Q4 at the primary side, the first synchronous rectifying switch SR1, and the second synchronous rectifying switch SR2 at the secondary side operate in the variable frequency mode. In addition, the duty cycles of the first rectifying control signal $S_{SR1}$ and the second rectifying control signal $S_{SR2}$ are limited to be the resonance period. That is, a turned-on time of the first synchronous rectifying switch SR1 is limited from the original time t0-time t1 to time t0-time t1'; a turned-on time of the second synchronous rectifying switch SR2 is limited from the original time t1-time t2 to time t1-time t2'. The variable frequency control is implemented by the frequency controller 164 shown in FIG. 5.

When the frequency control command $f_{CMD}$ is lower than the phase-shift frequency $f_{PS}$ set by the control unit 16, the LLC resonant converter 10 operates in a third operation mode M3 (also see FIG. 7C). In this operation mode, the first control signal $S_{Q1}$ (the same signal as the fourth control signal $S_{Q4}$) and the first rectifying control signal $S_{SR1}$ are frequency-variable and phase-shifted, and the second control signal $S_{Q2}$ (the same signal as the third control signal $S_{Q3}$) and the second rectifying control signal $S_{SR2}$ are frequency-variable and phase-shifted. Therefore, a rising edge phase difference a between the first control signal $S_{Q1}$ and the first rectifying control signal $S_{SR1}$ increases with the lower the frequency, and $\Phi_L$ is any number from 0 to 180 and greater than 0. In particular, the control unit 16 control the phase of the first rectifying control signal $S_{SR1}$ to lead the phase of the first control signal $S_{Q1}$, wherein the leading phase is DL degrees. Specifically, a phase of the first rectifying control signal $S_{SR1}$ is controlled to lead a phase of the first control signal $S_{Q1}$ (from the original time t0 to time t1'', i.e., $\Phi_L$-degree leading) by increasing a turned-on time of the first synchronous rectifying switch SR1. Similarly, a rising edge phase difference a between the second control signal $S_{Q2}$ and the second rectifying control signal $S_{SR2}$ increases with the lower the frequency. Specifically, a phase of the second rectifying control signal $S_{SR2}$ is controlled to lead a phase of the second control signal $S_{Q2}$ (from the original time t1 to time t2'', i.e., $\Phi_L$-degree leading) by increasing a turned-on time of the second synchronous rectifying switch SR2. Accordingly, when the output voltage of the LLC resonant converter 10 starts to fall due to insufficient input voltage, the output voltage of the LLC resonant converter 10 can still be maintained within a voltage range for a hold-up time so that the coupled rear-end electronic product has enough time to respond and perform complete storage or back up data before the power failure.

In this operation mode, the first switch Q1, the second switch Q2, the third switch Q3, the fourth switch Q4 at the primary side still operate in the variable frequency mode, but the first synchronous rectifying switch SR1 and the second synchronous rectifying switch SR2 at the secondary side operate in both the variable frequency mode and a phase shift (phase leading) mode. The variable frequency control and the phase leading control are implemented by a frequency and phase controller 165 shown in FIG. 5.

Figure 8:
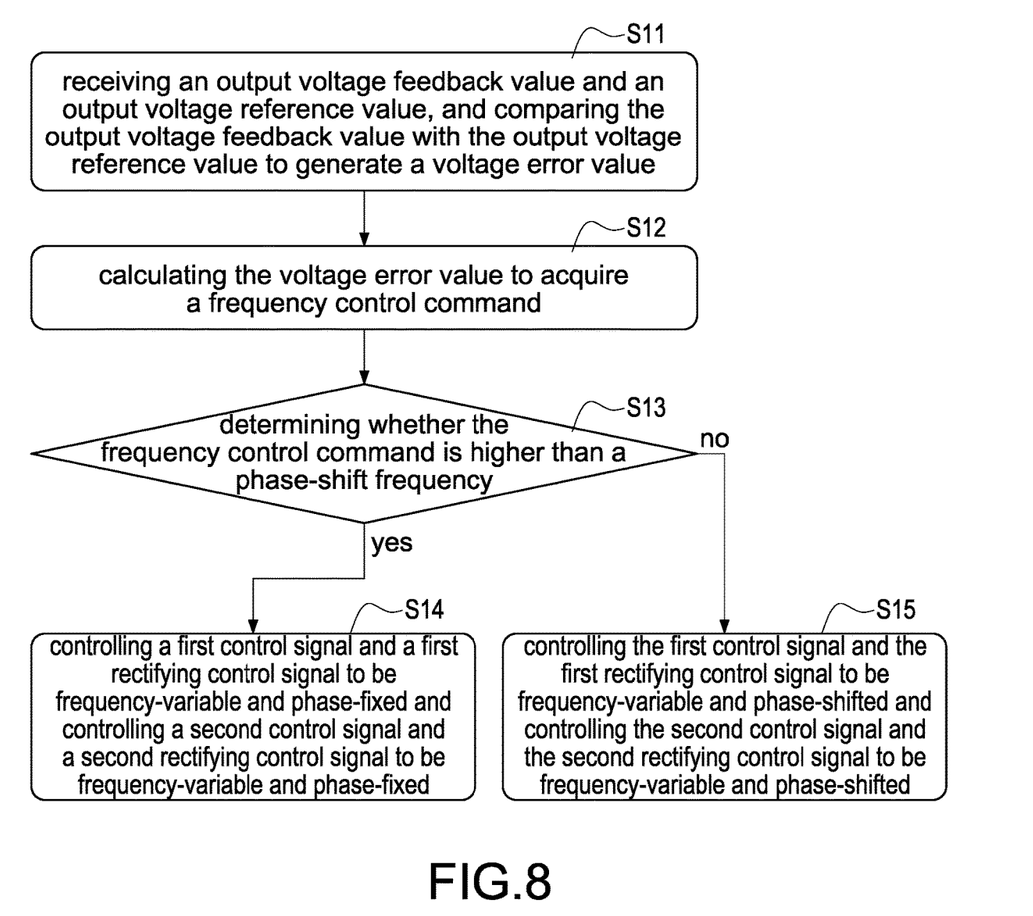
FIG. 8 is a flowchart of a method of controlling the LLC resonant converter according to the present disclosure.

Please refer to FIG. 8, which shows a flowchart of a method of controlling the LLC resonant converter according to the present disclosure. The LLC resonant converter includes a square wave generator at a primary side of a transformer and a synchronous rectifying unit at a secondary side of the transformer. The square wave generator includes at least a first switch controlled by a first control signal and a second switch controlled by a second control signal. The synchronous rectifying unit includes at least a first synchronous rectifying switch controlled by a first rectifying control signal and a second synchronous rectifying switch controlled by a second rectifying control signal.

The control method includes steps as follows. First, receiving an output voltage feedback value and an output voltage reference value, and comparing the output voltage feedback value with the output voltage reference value to generate a voltage error value (S11). Afterward, calculating the voltage error value to acquire a frequency control command (S12). Afterward, determining whether the frequency control command is higher than a phase-shift frequency (S13). If "YES" (i.e., the frequency control command is higher than the phase-shift frequency), controlling a first control signal and a first rectifying control signal to be frequency-variable and phase-fixed and controlling a second control signal and a second rectifying control signal to be frequency-variable and phase-fixed (S14). If "NO" (i.e., the frequency control command is lower than the phase-shift frequency), controlling the first control signal and the first rectifying control signal to be frequency-variable and phase-shifted and controlling the second control signal and the second rectifying control signal to be frequency-variable and phase-shifted (S15).

The step (S14) further includes a step of controlling a duty cycle of the first rectifying control signal and the second rectifying control signal to be a resonance period when the frequency control signal is higher than the phase-shift frequency but is lower than a resonance frequency.

The step (S15) further includes a step of controlling a phase of the first rectifying control signal to lead a phase of the first control signal and controlling a phase of the second rectifying control signal to lead a phase of the second control signal when the frequency control command is lower than the phase-shift frequency.

Accordingly, when the output voltage of the LLC resonant converter 10 starts to fall due to insufficient input voltage, the output voltage of the LLC resonant converter 10 can still be maintained within a voltage range for a hold-up time so that the coupled rear-end electronic product has enough time to respond and perform complete storage or back up data before the power failure.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:
1. An LLC resonant converter, comprising:
   a square wave generator, having a first switch and a second switch connected to the first switch in series,
   a resonant tank coupled to the square wave generator, a transformer having a primary side and a secondary side, and the primary side coupled to the resonant tank, a synchronous rectifying unit coupled to the secondary side, and having a first synchronous rectifying switch and a second synchronous rectifying switch, and a control unit configured to receive an output voltage of the resonant converter, acquire a frequency control command according to the output voltage, and provide a first control signal to control the first switch, a second control signal to control the second switch, a first rectifying control signal to control the first synchronous rectifying switch, and a second rectifying control signal to control the second synchronous rectifying switch, wherein when the frequency control command is higher than a phase-shift frequency, the first control signal and the first rectifying control signal are frequency-variable and phase-fixed, and the second control signal and the second rectifying control signal are frequency-variable and phase-fixed; when the frequency control command is lower than the phase-shift frequency, the first control signal and the first rectifying control signal are frequency-variable and phase-shifted, and the second control signal and the second rectifying control signal are frequency-variable and phase-shifted.

2. The LLC resonant converter as claimed in claim 1, wherein when the frequency control command is higher than the phase-shift frequency but is lower than a resonance frequency, a duty cycle of the first rectifying control signal and the second rectifying control signal is a resonance period.

3. The LLC resonant converter as claimed in claim 1, wherein when the frequency control command is lower than the phase-shift frequency, a phase of the first rectifying control signal leads a phase of the first control signal, and a phase of the second rectifying control signal leads a phase of the second control signal.

4. The LLC resonant converter as claimed in claim 1, wherein the control unit comprises:

a comparison unit configured to receive an output voltage feedback value corresponding to the output voltage and an output voltage reference value, and compare the output voltage feedback value with the output voltage reference value to generate a voltage error value, and a voltage controller configured to receive the voltage error value, and calculate the voltage error value to acquire the frequency control command.

5. The LLC resonant converter as claimed in claim 1, wherein the square wave generator comprises a first switch bridge arm composed of a first switch and a second switch to form a half-bridge circuit structure.

6. The LLC resonant converter as claimed in claim 1, wherein the square wave generator comprises a first switch bridge arm composed of a first switch and a second switch, and a second switch bridge arm composed of a third switch and a fourth switch to form a full-bridge circuit structure.

7. The LLC resonant converter as claimed in claim 1, wherein the transformer is a center-tapped transformer, and the first synchronous rectifying switch and the second synchronous rectifying switch are coupled to two ends of the transformer, respectively.

8. The LLC resonant converter as claimed in claim 1, wherein the transformer is coupled to a first synchronous rectifying bridge arm composed of the first synchronous rectifying switch and the second synchronous rectifying switch, and a second synchronous rectifying bridge arm composed of a third synchronous rectifying switch and a fourth synchronous rectifying switch to form a full-bridge rectifying circuit structure.

9. The LLC resonant converter as claimed in claim 3, wherein the phase of the first rectifying control signal leads the phase of the first control signal by increasing a turned-on time of the first synchronous rectifying switch; the phase of the second rectifying control signal leads the phase of the second control signal by increasing a turned-on time of the second synchronous rectifying switch.

10. A control unit of an LLC resonant converter, the control unit configured to provide a control signal to control a square wave generator at a primary side of the resonant converter and provide a rectifying control signal to control a synchronous rectifying unit at a secondary side, and the control unit configured to acquire a frequency control command according to an output voltage of the resonant converter, wherein when the frequency control command is higher than a phase-shift frequency, the control signal and the rectifying control signal are frequency-variable and phase-fixed; when the frequency control command is lower than the phase-shift frequency, the control signal and the rectifying control signal are frequency-variable and phase-shifted.

11. The control unit of the LLC resonant converter as claimed in claim 10, wherein when the frequency control command is higher than the phase-shift frequency but is lower than a resonance frequency, a duty cycle of the rectifying control signal is a resonance period.

12. The control unit of the LLC resonant converter as claimed in claim 10, wherein when the frequency control command is lower than the phase-shift frequency, a phase of the rectifying control signal leads a phase of the control signal.

13. The control unit of the LLC resonant converter as claimed in claim 12, wherein the phase of the rectifying control signal leads the phase of the control signal by increasing a turned-on time of a synchronous rectifying switch correspondingly controlled by the rectifying control signal.

14. A method of controlling an LLC resonant converter, the resonant converter comprising a switch bridge arm at a primary side of a transformer and a synchronous rectifying unit at a secondary side of the transformer; the switch bridge arm composed of a first switch controlled by a first control signal and a second switch controlled by a second control signal, and the synchronous rectifying unit composed of a first synchronous rectifying switch controlled by a first rectifying control signal and a second synchronous rectifying switch controlled by a second rectifying control signal, the method comprising steps of:

acquiring an operation frequency according to an output voltage feedback value, determining whether the operation frequency is higher than a phase-shift frequency, controlling the first control signal and the first rectifying control signal to be frequency-variable and phase-fixed and controlling the second control signal and the second rectifying control signal to be frequency-variable and phase-fixed when the operation frequency is higher than the phase-shift frequency, and controlling the first control signal and the first rectifying control signal to be frequency-variable and phase-shifted and controlling the second control signal and the second rectifying control signal to be frequency-variable and phase-shifted when the operation frequency is lower than the phase-shift frequency.

15. The method of controlling the LLC resonant converter as claimed in claim 14, further comprising a step of:
controlling a duty cycle of the first rectifying control signal and the second rectifying control signal to be a resonance period when the operation frequency is higher than the phase-shift frequency but is lower than a resonance frequency.

16. The method of controlling the LLC resonant converter as claimed in claim 14, further comprising a step of:
controlling a phase of the first rectifying control signal to lead a phase of the first control signal and controlling a phase of the second rectifying control signal to lead a phase of the second control signal when the operation frequency is lower than the phase-shift frequency.

17. The method of controlling the LLC resonant converter as claimed in claim 16, wherein the phase of the first rectifying control signal leads the phase of the first control signal by increasing a turned-on time of the first synchronous rectifying switch; the phase of the second rectifying control signal leads the phase of the second control signal by increasing a turned-on time of the second synchronous rectifying switch.

* * * * *